United States Patent
Leppert

(10) Patent No.: US 7,276,705 B2
(45) Date of Patent: Oct. 2, 2007

(54) LUMINESCENT BODY FOR AN X-RAY DETECTOR AND METHOD FOR PRODUCING IT

(75) Inventor: Juergen Leppert, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 482 days.

(21) Appl. No.: 10/902,286

(22) Filed: Jul. 30, 2004

(65) Prior Publication Data

US 2005/0035294 A1    Feb. 17, 2005

(30) Foreign Application Priority Data

Jul. 31, 2003   (DE) ................. 103 35 125

(51) Int. Cl.
*G01T 1/20* (2006.01)
(52) U.S. Cl. ..................................... 250/367
(58) Field of Classification Search ................. 250/367
See application file for complete search history.

(56) References Cited

U.S. PATENT DOCUMENTS

| 3,917,950 A * | 11/1975 | Carlson ................. 250/483.1 |
| 4,870,279 A | 9/1989 | Cueman et al. ............ 250/368 |
| 5,296,163 A | 3/1994 | Leppert et al. |
| 5,594,253 A * | 1/1997 | Bueno et al. ............ 250/486.1 |
| 7,054,408 B2 * | 5/2006 | Jiang et al. ................. 378/19 |
| 2003/0155515 A1 | 8/2003 | Moy et al. ............... 250/361 R |

FOREIGN PATENT DOCUMENTS

| DE | 39 18 843 A1 | 6/1988 |
| DE | 41 24 875 A1 | 1/1993 |
| DE | 42 24 931 A1 | 2/1994 |
| DE | 19709691 A1 | 9/1998 |
| DE | 198 50 116 A1 | 10/1998 |
| DE | 197 15 725 C1 | 12/1998 |
| DE | 101 16 803 A1 | 10/2002 |
| FR | 2 812 089 A1 | 7/2000 |

\* cited by examiner

*Primary Examiner*—David Porta
*Assistant Examiner*—Mindy Vu
(74) *Attorney, Agent, or Firm*—Harness, Dickey & Pierce, P.L.C.

(57) ABSTRACT

A luminescent body is for an X-ray detector, in particular for an X-ray computer tomograph. It contains a ceramic of the general composition $(M_{1-x}Ln_x)_2O_2S$, M being at least one element selected from the group: Y, La, Sc, Lu and/or Gd, and Ln being at least one element selected from the group: Eu, Ce, Pr, Tb, Yb, Dy, Sm and/or Ho. In order to improve the spatial resolution of the luminescent body, the ceramic is used in the form of fibers, which are connected in a parallel alignment to constitute a fiber plate.

27 Claims, 1 Drawing Sheet

LUMINESCENT BODY FOR AN X-RAY DETECTOR AND METHOD FOR PRODUCING IT

The present application hereby claims priority under 35 U.S.C. §119 on German patent application number DE 103 35 125.6 filed Jul. 31, 2003, the entire contents of which are hereby incorporated herein by reference.

FIELD OF THE INVENTION

The invention generally relates to a luminescent body and to a method for producing it.

BACKGROUND OF THE INVENTION

A luminescent body of a generic type is known, for example, from DE 42 24 931 A1. The known luminescent body exhibits isotropic conduction of light. Thus, scintillation light formed by incident X-radiation emerges from the luminescent body uniformly in all directions.

Especially in the field of X-ray computer tomography, it is necessary for incident X-radiation to be detected with spatial resolution. To this end, the known luminescent bodies are adhesively bonded onto an electronic detector element, which records the emitted scintillation light.

The luminescent bodies are structured, for example provided with notches, and/or optically isolated from one another by means of collimators in order to suppress lateral propagation of light. This can prevent crosstalk with a neighboring detector element due to lateral propagation of light. Production of the known luminescent body and the provision of a collimator are expensive.

DE 197 15 275 C1 describes a luminescent body with anisotropic conduction of light. A body made of the luminescent substance is in this case provided with optical channels, in which the luminescent light emerges and is delivered along a privileged direction. In practice, it has been found that the luminous efficiencies achievable with such luminescent bodies are not very high.

DE 101 16 803 A1 discloses a radiation transducer in which needle crystals are applied to a substrate by way of evaporation. The needle crystals extend perpendicular to the face of the substrate. The production of such needle crystals is restricted to particular luminescent materials. Such luminescent materials are unsuitable for producing X-ray detectors for X-ray computer tomography.

DE 41 24 875 A1 discloses a radiation transducer screen. The luminescent body is in this case made of a glass ceramic. The luminescent crystals can be produced in a direction extending perpendicular to the detector plane by directional crystallization. This gives rise to anisotropic conduction of light. Unfortunately certain luminescent substances, in particular. luminescent substances for producing detectors for X-ray computer tomography, are incompatible with a glass-ceramic production method.

SUMMARY OF THE INVENTION

It is an object of an embodiment of the present invention to lessen or even overcome at least one of the disadvantages of the prior art. It is a particular object of one embodiment to provide a luminescent body for an X-ray detector, which exhibits anisotropic conduction of light and also has a high luminous efficiency. It is also an object of an embodiment of the invention to provide a maximally efficient method for producing such a luminescent body.

An embodiment of the invention provides a luminescent body for an X-ray detector, in which the ceramic is used in the form of fibers that are connected in a parallel alignment to constitute a fiber plate.

Such a luminescent body is distinguished by anisotropic conduction of light parallel to the fiber axes. It has a particularly high luminous efficiency. The proposed luminescent body is very suitable for producing detectors for X-ray computer tomography.

According to an advantageous refinement, the fibers are connected by a binder. The latter may be a plastic, preferably an epoxy resin. A substance that reflects light may be added to the binder. This may for example be a metal powder, a dye or the like. Owing to the addition of the substance that reflects light, scintillation light propagating laterally in the luminescent body is reflected at the ceramic interface surrounding the binder. This can further increase the luminous efficiency.

It is also possible for the fibers to be connected together by way of sintered bridges. It may be unnecessary to provide a binder in this case.

The fibers may, for example, have a diameter of from 50 µm to 500 µm, preferably from 100 µm to 200 µm. They are expediently arranged parallel to the short edges of the fiber plate.

According to a particularly preferred refinement feature, an X-ray detector is provided in which the fiber plate according to an embodiment of the invention is applied to a photodiode or photodiode array so that the fibers are aligned perpendicular to the detector face(s). This ensures spatially resolved measurement of the incident X-radiation. Undesirable crosstalk with neighboring detector elements is reliably avoided. The proposed X-ray detector is very suitable for X-ray computer tomography.

According to the method of an embodiment of the invention, the following steps are provided for producing a luminescent body for an X-ray detector:

producing a precursor by dissolving a compound, which contains $(M_{1-x}Ln_x)^{3+}$ ions, in citric acid and prepolymerizing the solution, producing filaments from the precursor, calcining and sintering the filaments so as to form ceramic fibers consisting of an $(M_{1-x}Ln_x)O_3$ ceramic, converting the $(M_{1-x}Ln_x)O_3$ ceramic in a reducing atmosphere, which contains sulfur, into an $(M_{1-x}Ln_x)_2O_2S$ ceramic and connecting the fibers formed by the $(M_{1-x}Ln_x)_2O_2S$ ceramic in a parallel alignment to constitute a fiber plate.

Highly viscous precursors, which are very suitable for producing filaments, can be readily produced on the basis of polymerized citric acid, for example. Such filaments may firstly be converted using conventional techniques into an oxide ceramic formed by $(M_{1-x}Ln_x)O_3$. Likewise using conventional techniques, the oxide ceramic may subsequently be converted into an oxysulfide ceramic formed by $(M_{1-x}Ln_x)_2O_2S$. Luminescent fibers based on $(M_{1-x}Ln_x)_2O_2S$ can thus be produced in a relatively straightforward and reproducible way. The fibers that are produced may subsequently be processed to constitute a fiber plate.

The proposed method is particularly suitable for producing luminescent bodies with anisotropic conduction of light, which, for example, do not form glasses and consequently cannot be converted into a glass ceramic with a preferential crystal orientation by directional crystallization. The proposed method is moreover easy to carry out and can be technologically controlled well.

The compound which contains $(M_{1-x}Ln_x)^{3+}$ ions may be selected from the following group: $(M_{1-x}Ln_x)OH_3 \cdot nH_2O$, $(M_{1-x}Ln_x)_2O_3$ or $(M_{1-x}Ln_x)_2(CO_3)_3$.

According to an advantageous refinement, the precursor is adjusted to a predetermined viscosity by heating. The viscosity is expediently selected so that filaments can be drawn from the precursor, for example by using nozzles. In order to adjust the predetermined viscosity, the precursor may be kept at a temperature of from 60 to 80° C. for a predetermined holding time, for example from 1 to 10 h, while being constantly stirred.

A mixture of $H_2$ and $H_2S$ has been found to be particularly suitable as the reducing atmosphere. Quantitative conversion of the oxide ceramic into the oxysulfide ceramic can be achieved in this way. Elemental sulfur and carbon disulfide are also viable as sources of sulfur. The conversion is expediently carried out at a temperature of from 500 to 1000° C. The holding time may be from 30 min to 10 h. The $H_2S$ concentration may in this case be between 5 and 100 vol. %. A mixture of $N_2$ and $CS_2$ may also be used as the gas containing sulfur. Such a mixture can be produced by passing $N_2$ through $CS_2$.

The fibers may be connected by way of a binder. In this context, reference is made to the previous remarks about the luminescent body.

It is furthermore possible to connect the fibers together by way of sintering. In this case, it has proved expedient to use at least one of the following sintering auxiliaries for the sintering: alkali metal hydroxide, alkali metal halide, alkali metal sulfide, alkali metal metasilicate. The aforementioned sintering auxiliaries are expediently added in an amount of from 0.02 to 1.0 wt. %. A sintering temperature in the range of from 800 to 1500° C. has been found to be suitable for connecting the fibers.

BRIEF DESCRIPTION OF THE DRAWINGS

Exemplary embodiments of the invention will be explained in more detail below with reference to the drawings, in which.

DETAILED DESCRIPTION OF THE PREFERRED EMBODIMENTS

Figure 1:
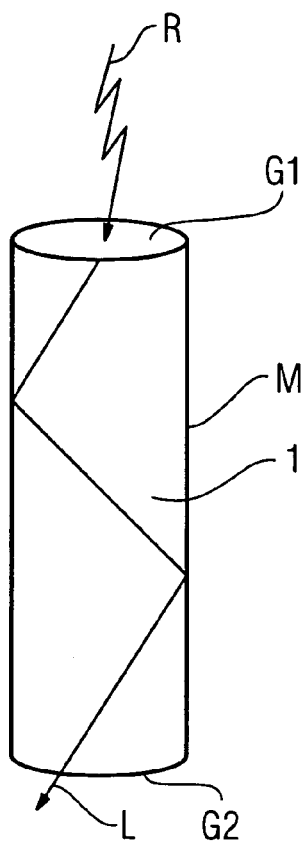
FIG. 1 shows a schematic view of a fiber.

FIG. 1 shows a fiber 1, produced for example from $Gd_2O_2S$:Eu (GOS), in a perspective view. The fiber 1 has a diameter of about 100 μm. X-radiation R striking a first base face G1 is converted into light L. Some of the light L is delivered as far as an opposite second base face G2 by being reflected from a longitudinal surface M of the fiber 1. It emerges from the second base face G2.

Figure 2:
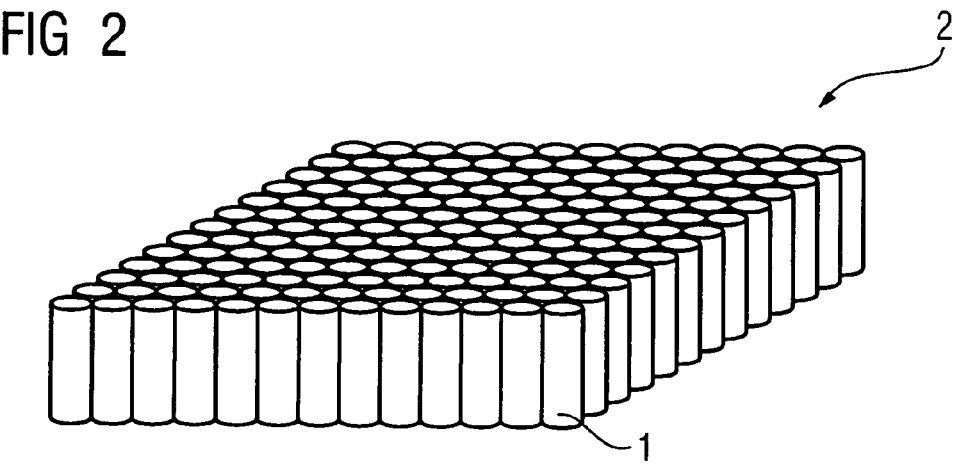
FIG. 2 shows a schematic perspective view of the fiber plate produced from the fibers according to FIG. 1.

FIG. 2 shows a fiber plate 2 produced from the fibers 1 according to FIG. 1. The fibers 1 are connected together via their longitudinal surfaces M in a parallel alignment. The connection may be carried out by way of a binder, for example, such as epoxy resin. The binder may be dyed in order to improve the reflection of light by the longitudinal surface M. Reflective substances, for example metal particles, may also be added to the binder. It is furthermore possible for the fibers 1 to be connected together by sintering. Such a sintering process may be accelerated by the addition of sintering auxiliaries. The sintering temperatures can be lowered by the addition of sintering auxiliaries. The fibers 1 are arranged parallel to the short edge of the fiber plate 2.

Figure 3:
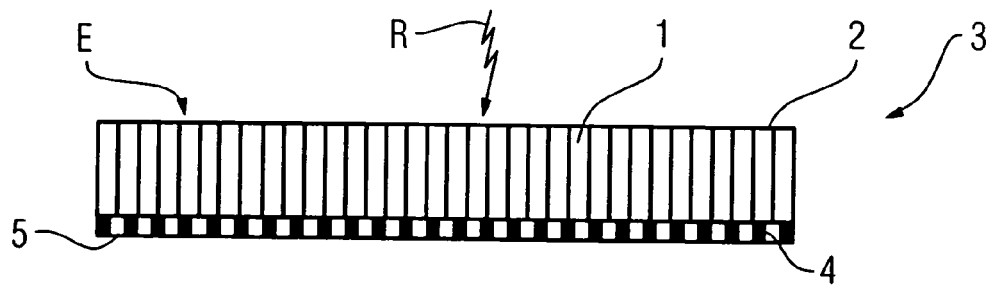
FIG. 3 shows a sectional view through an X-ray detector produced using a fiber plate according to FIG. 2.

FIG. 3 shows a schematic cross-sectional view of an X-ray detector 3. A fiber plate 2 according to FIG. 2 is applied to a photodiode array 5 formed by photodiodes 4. The fibers 1 are perpendicular to detector faces of the photodiodes 4.

As can be seen clearly by studying FIGS. 1 and 3 together, X-radiation R striking the fibers 1 on an incidence face E formed by the first base faces G1 is converted into light L. The light L propagates through the fibers 1 and emerges from the opposite second base face G2. It is recorded there by the photodiode 4 lying underneath.

The light L formed in a fiber 1 is recorded with a high spatial resolution by the photodiodes 4. No crosstalk takes place with neighboring photodiodes 4. The light L formed in the fibers 1 is anisotropically delivered essentially perpendicular to the detector face of the photodiodes 4. This obviates the need to structure the luminescent body and/or to provide a collimator.

In order to produce the fibers 1 according to an embodiment of the invention, the metal oxides $Gd_2O_3$ and $Eu_2O_3$ are weighed out in a molar ratio of 97%:3% and subsequently dissolved in hot concentrated (65% strength) $HNO_3$. The concentration of the solution is adjusted to 1.0 mol/l.

The corresponding metal hydroxides, that is to say (Gd: Eu) $(OH)_3 \cdot nH_2O$, are precipitated from 200 ml of the solution by adding 25% strength $NH_3$ solution in excess, and are isolated by vacuum filtration. The freshly precipitated metal hydroxides are then slowly dissolved fully in concentrated citric acid (80 g of citric acid monohydrate/100 ml of $H_2O$) at a temperature of 60° C. while stirring constantly. After adding 60 ml of ethylene glycol, the sol which is formed is kept at a temperature of 80° C. for several hours, until a predetermined viscosity has been achieved.

The gel which is formed is then pressurized through a nozzle to produce filaments, and dried for several hours by heating at a temperature of about 80° C. The solidified gel is subsequently calcined at a temperature of from 500 to 700° C. in an oxygen atmosphere. The $(Gd_{0.97}Eu_{0.03})_2O_3$ ceramic thereby formed is subsequently converted into $(Gd_{0.97}Eu_{0.03})_2O_2S$ (GOS) in an $H_2/H_2S$ atmosphere at a temperature of from 500 to 1000° C.

In order to produce the fiber plate 2, the GOS fibers produced in this way are cut to equal lengths, placed parallel in a mold and impregnated with epoxy resin. The surfaces are ground plane-parallel after release from the mold.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A luminescent body for an X-ray detector, comprising:
    a ceramic of the general composition $(M_{1-x}Ln_x)_2O_2S$, M being at least one element selected from the group consisting of Y, La, Sc, Lu and Gd and Ln being at least one element selected from the group consisting of Eu, Ce, Pr, Tb, Yb, Dy, Sm and Ho,
    wherein the ceramic is used in the form of fibers, connected in a parallel alignment to constitute a fiber plate; and the ceramic is formed from a compound which contains $(M_{1-x}Ln_x)^{3+}$ ions selected from the group consisting of $(M_{1-x}Ln_x)OH_3 \cdot nH_2O$, $(M_{1-x}Ln_x)_2O_3$ and $(M_{1-x}Ln_x)_2(CO_3)_3$.

2. The luminescent body as claimed in claim 1, wherein the fibers are connected by a binder.

3. The luminescent body as claimed in claim 2, wherein the binder is a plastic.

4. The luminescent body as claimed in claim 2, wherein a substance that reflects light is added to the binder.

5. The luminescent body as claimed in claim 2, wherein the binder is an epoxy resin.

6. The luminescent body as claimed in claim 1, wherein the fibers are connected together by sintered bridges.

7. The luminescent body as claimed in claim 1, wherein the fibers include a diameter of from 50 µm to 500 µm.

8. The luminescent body as claimed in claim 1, wherein the fibers are arranged parallel to relatively short edges of the fiber plate.

9. An X-ray detector, comprising the fiber plate according to claim 8, wherein the fiber plate is applied to at least one of a photodiode and photodiode array such that the fibers are aligned perpendicular to the detector face.

10. An X-ray computer tomograph, comprising the luminescent body according to claim 1.

11. The luminescent body as claimed in claim 1, wherein the fibers include a diameter of from 100 µm to 200 µm.

12. A method for producing a luminescent body for an X-ray detector formed by a ceramic of the general composition $(M_{1-x}Ln_x)_2O_2S$, M being at least one element selected from the group Y, La, Sc, Lu and Gd, and Ln being at least one element selected from the group consisting of Eu, Ce, Pr, Tb, Yb, Dy, Sm and Ho, the method comprising:
producing a precursor in a solution by dissolving a compound in citric acid and prepolymerizing the solution, the compound containing $(M_{1-x}Ln_x)^{3+}$ ions selected from the group consisting of $(M_{1-x}Ln_x)OH_3 \cdot nH_2O$, $(M_{1-x}Ln_x)_2O_3$ and $(M_{1-x}Ln_x)_2(CO_3)_3$;
producing filaments from the precursor;
calcining and sintering the filaments so as to form ceramic fibers consisting of an $(M_{1-x}Ln_x)O_3$ ceramic;
converting the $(M_{1-x}Ln_x)O_3$ ceramic in a reducing atmosphere, which contains sulfur, into an $(M_{1-x}Ln_x)_2O_2S$ ceramic; and connecting the fibers formed by the $(M_{1-x}Ln_x)_2O_2S$ ceramic in a parallel alignment to constitute a fiber plate.

13. The method as claimed claim 12, wherein the precursor is adjusted to a predetermined viscosity by heating.

14. The method as claimed in claim 12, wherein the reducing atmosphere is formed by one or more of the following gases: $H_2$, $H_2S$, $CS_2$.

15. The method as claimed in claim 12, wherein the conversion is carried out at a temperature of from 500° C. to 1000° C.

16. The method as claimed in claim 12, wherein the fibers are connected by a binder.

17. The method as claimed in claim 16, wherein the binder is a plastic.

18. The method as claimed in claim 16, wherein a substance that reflects light is added to the binder.

19. The method as claimed in claim 12, wherein the fibers are connected together by sintered bridges.

20. The method as claimed in claim 12, wherein at least one of the following sintering auxiliaries is used for the sintering: alkali metal hydroxide, alkali metal halide, alkali metal sulfide, and alkali metal metasilicate.

21. A method of manufacturing an X-ray computer tomograph, comprising forming the luminescent body according to claim 12.

22. The method as claimed claim 12, wherein the precursor is adjusted to a predetermined viscosity by heating.

23. An X-ray detector, comprising:
a fiber plate including a plurality of fibers made of a ceramic of the general composition $(M_{1-x}Ln_x)_2O_2S$, M being at least one element selected from the group Y, La, Sc, Lu and Gd, and Ln being at least one element selected from the group Eu, Ce, Pr, Tb, Yb, Dy, Sm and Ho,
wherein the ceramic is formed from a compound which contains $(M_{1-x}Ln_x)^{3+}$ ions selected from the group consisting of $(M_{1-x}Ln_x)OH_3 \cdot nH_2O$, $(M_{1-x}Ln_x)_2O_3$ and $(M_{1-x}Ln_x)_2(CO_3)_3$.

24. The X-ray detector according to claim 23, wherein the fiber plate is applied to at least one of a photodiode and photodiode array.

25. The X-ray detector according to claim 24, wherein the fibers are arranged parallel to relatively short edges of the fiber plate.

26. The method according to claim 12, wherein the fibers are connected by a binder.

27. The method according to claim 26, wherein the binder is an epoxy resin.

* * * * *